(12) United States Patent
Gubler et al.

(10) Patent No.: US 10,666,868 B2
(45) Date of Patent: *May 26, 2020

(54) FAST ATTITUDE ERROR CORRECTION

(71) Applicant: GoPro, Inc., San Mateo, CA (US)

(72) Inventors: Thomas Gubler, Winterthur (CH); Garance Bruneau, Zurich (CH); Axel Murguet, Zurich (CH); Pascal Gohl, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,791

(22) Filed: Jun. 12, 2019

(65) Prior Publication Data

US 2019/0364212 A1    Nov. 28, 2019

Related U.S. Application Data

(63) Continuation of application No. 15/788,769, filed on Oct. 19, 2017, now Pat. No. 10,362,228.

(60) Provisional application No. 62/411,574, filed on Oct. 22, 2016.

(51) Int. Cl.
| | |
|---|---|
| H04N 5/232 | (2006.01) |
| B64C 39/02 | (2006.01) |
| B64D 47/08 | (2006.01) |
| G01C 21/18 | (2006.01) |
| G03B 15/00 | (2006.01) |
| G03B 17/56 | (2006.01) |

(52) U.S. Cl.
CPC ....... *H04N 5/23287* (2013.01); *B64C 39/024* (2013.01); *B64D 47/08* (2013.01); *G01C 21/18* (2013.01); *G03B 15/006* (2013.01); *G03B 17/561* (2013.01); *H04N 5/2328* (2013.01); *H04N 5/23206* (2013.01); *H04N 5/23258* (2013.01); *B64C 2201/024* (2013.01); *B64C 2201/127* (2013.01); *H04N 5/23216* (2013.01)

(58) Field of Classification Search
None
See application file for complete search history.

(56) References Cited

U.S. PATENT DOCUMENTS

| | | |
|---|---|---|
| 6,292,215 B1 | 9/2001 | Vincent |
| 7,916,070 B2 | 3/2011 | Alexander |
| 8,645,063 B2 | 2/2014 | Fortier |
| 2002/0008661 A1 | 1/2002 | McCall |
| 2004/0179104 A1 | 9/2004 | Benton |
| 2004/0183917 A1 | 9/2004 | Von Flotow |
| 2014/0372063 A1 | 12/2014 | Niu |
| 2018/0052006 A1 | 2/2018 | Ell |

*Primary Examiner* — Gelek W Topgyal
(74) *Attorney, Agent, or Firm* — Young Basile Hanlon & MacFarlane, P.C.

(57) ABSTRACT

An aerial vehicle platform includes an aerial vehicle, a gimbal coupled to the aerial vehicle, and a camera mounted to the gimbal. An attitude sensing system includes an inertial measurement unit to sense attitude and an attitude adjustment module to generate an attitude adjustment for adjusting the sensed attitude to compensate for drift error.

20 Claims, 8 Drawing Sheets

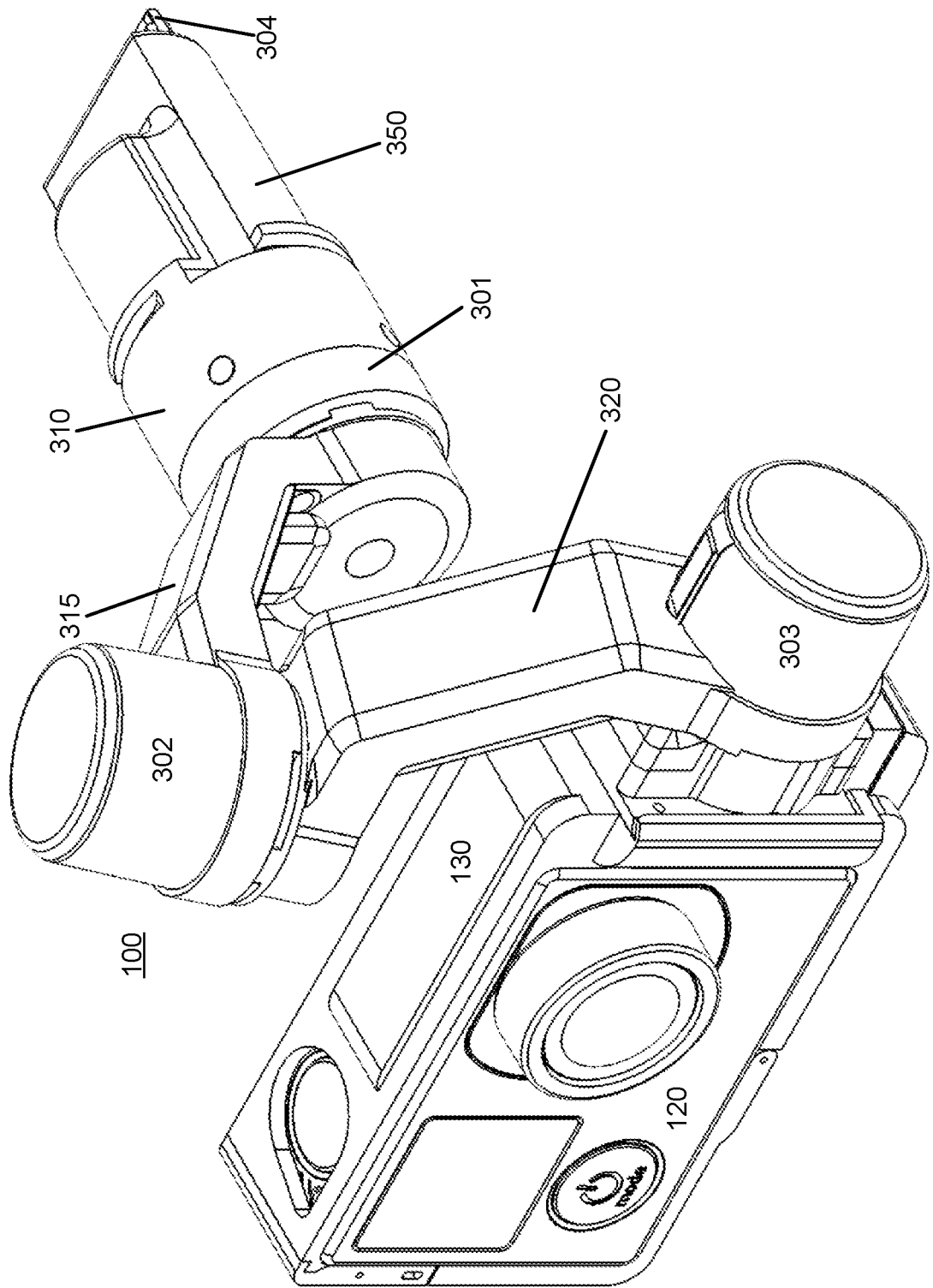

FAST ATTITUDE ERROR CORRECTION

CROSS-REFERENCE TO RELATED APPLICATION(S)

This application is a continuation of U.S. patent application Ser. No. 15/788,769, filed on Oct. 19, 2017, which claims the benefit of U.S. Provisional Application No. 62/411,574 filed on Oct. 22, 2016, the contents of which are incorporated by reference herein.

BACKGROUND

Field of Art

The disclosure generally relates to the field of gimbals and in particular to a gimbal configured to correct the attitude estimation of an inertial measurement unit.

Description of Art

The use of an electronic gimbal to stabilize or to set the orientation of a camera is known. A gimbal can be mounted to a platform such as an electronic vehicle. For example, a camera can be mounted via a gimbal to a remote control road vehicle or aerial vehicle to capture images as the vehicle is controlled remotely by a user. A gimbal can allow the recording of stable video even when the platform is unstable.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 3A and 3B illustrate an example of a gimbal and camera.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An aerial vehicle platform includes an aerial vehicle, a gimbal coupled to the aerial vehicle, and a camera mounted to the gimbal. An attitude sensing system includes an inertial measurement unit to sense attitude and an attitude adjustment module to generate an attitude adjustment for adjusting the sensed attitude to compensate for drift error. The inertial measurement unit includes one or more gyroscopes to generate a sensed attitude and one or more accelerometers to generate a sensed acceleration vector. The inertial measurement unit combines the sensed attitude with an attitude adjustment value generated by the attitude adjustment module to generate an adjusted sensed attitude.

An attitude correction determination module generates an estimated attitude from the sensed acceleration vector and generates an attitude correction factor based on a difference between the estimated attitude and the adjusted sensed attitude. In an embodiment, a gyroscope saturation detection module detects a saturation condition of the one or more gyroscopes and generates a saturation condition signal indicative of the saturation condition. A scaling factor module detects, from the sensed acceleration vector, a stability measure of the inertial measurement unit and generates a scaling factor based at least in part on the stability measure. The scaling factor may furthermore be based on the saturation condition signal. An attitude estimate alteration module combines the correction factor and the scaling factor to generate the attitude adjustment value to compensate for the drift error.

Example System Configuration

Figure 1:
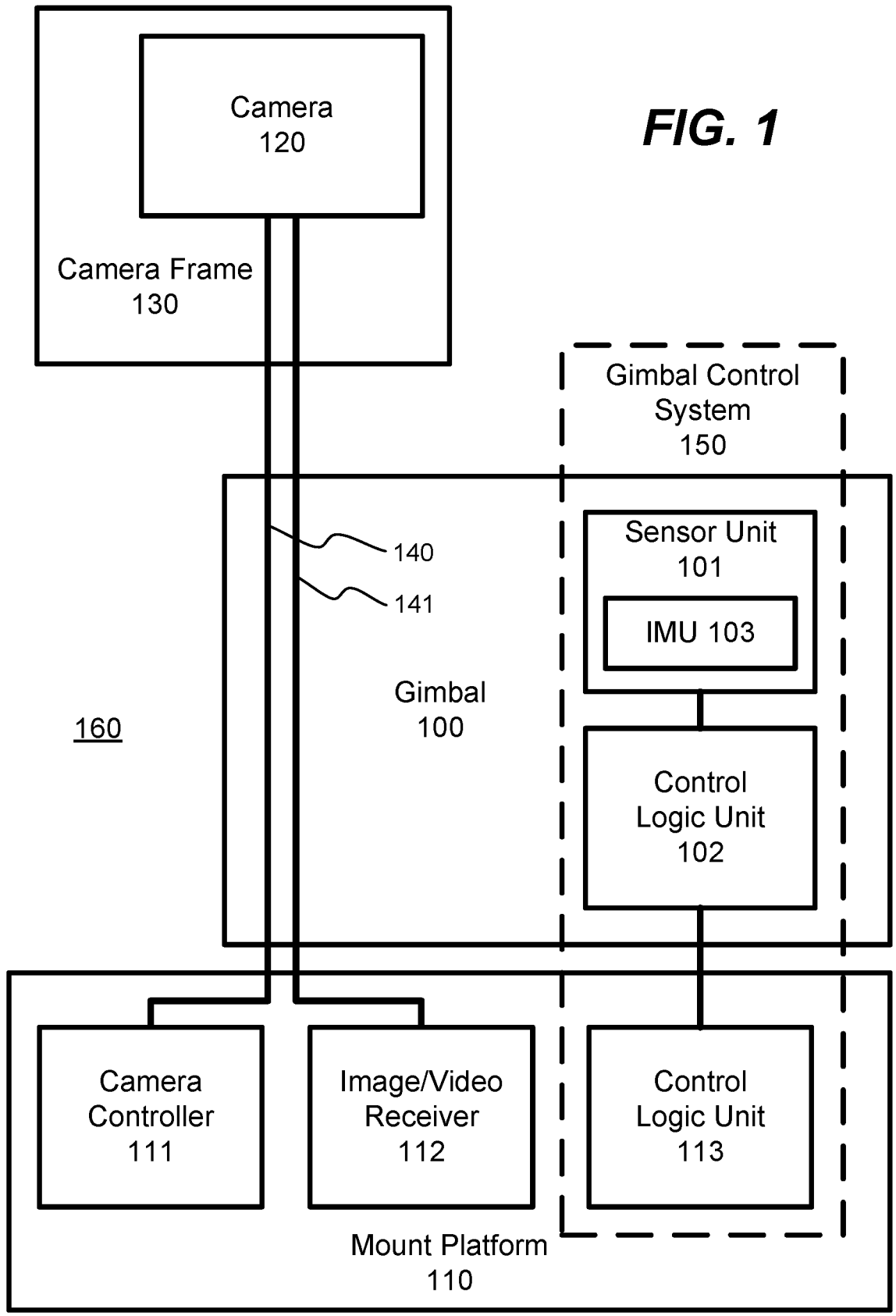
FIG. 1 is a functional block diagram illustrating an example configuration of a camera mounted on a gimbal which is, in turn, mounted to a mount platform.

Turning now to FIG. 1, which is a functional block diagram illustrating an example system framework. In this example, the gimbal system 160 includes a gimbal 100, a mount platform 110, a camera 120, a camera frame 130, a camera control connection 140 and a camera output connection 141, and a gimbal control system 150. The gimbal 100 includes a sensor unit 101 and a control logic unit 102. The mount platform 110 includes a camera controller 111, an image/video receiver 112, and a control logic unit 113. The camera 120 couples to the camera frame 130 which is mounted on the gimbal 100 which is, in turn, coupled to the mount platform 110. The coupling between the gimbal 100 and the mount platform 110 includes a mechanical coupling and a communication coupling. The camera control connection 140 and a camera output connection 141 connect the camera 120 to the mount platform 110 for communication coupling. The camera control connection 140 and a camera output connection 141 are composed of interconnecting electronic connections and data busses in the mount platform 110, gimbal 100, camera frame 130 and camera 120. The gimbal control system 150 controls the gimbal 100 using a combination of a sensor unit 101 and a control logic unit 102 in the gimbal 100 and a control logic unit 113 in the mount platform 110.

The camera 120 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. The camera 120 can capture images and videos at various frame rates, resolutions, and compression rates. The camera 120 can be connected to the camera frame 130, which mechanically connects to the camera and physically connects to the gimbal 100. FIG. 1 depicts the camera frame 130 enclosing the camera 120 in accordance with some embodiments. In some embodiments, the camera frame 130 does not enclose the camera 120, but functions as a mount to which the camera 120 couples. Examples of mounts include a frame, an open box, or a plate. Alternately, the camera frame 130 can be omitted and the camera 120 can be directly attached to a camera mount which is part of the gimbal 100.

The gimbal 100 is, in some embodiments, an electronic three-axis gimbal which rotates a mounted object (e.g., a camera frame 130 connected to a camera 120) in space (e.g., pitch, roll, and yaw). In addition to providing part of an electronic connection between the camera 120 and the mount platform 110, the gimbal includes a sensor unit 101 and a control logic unit 102, both of which are part of a gimbal control system 150. The gimbal control system 150 detects the orientation of the gimbal 100 and camera 120, determines a preferred orientation of the camera 120, and controls the motors of the gimbal in order to re-orient the camera 120 to the preferred position.

The sensor unit 101 includes an inertial measurement unit (IMU) 103 which measures rotation, orientation, and acceleration using sensors, such as accelerometers, gyroscopes, and magnetometers. The IMU 103 may include a 3-dimensional linear accelerometer that measures the proper acceleration (i.e., acceleration relative to freefall in gravity) of the portion of the gimbal 100 where the accelerometer is located. The IMU 103 may also include a gyroscope for detecting rotation in 3-dimensions.

The sensor unit 101 may also contain rotary encoders, which detect the angular position of the motors of the gimbal 100, and a magnetometer to detect a magnetic field, such as the earth's magnetic field. In some embodiments, the sensors of the sensor unit 101 are placed such as to provide location diversity. For example, a set of accelerometers and gyroscopes of the IMU 103 can be located near the camera 120 (e.g., near the connection to the camera frame 130) and a set of accelerometers and gyroscopes can be placed at the opposite end of the gimbal 100 (e.g., near the connection to the mount platform 110). The outputs of these two sets of sensors can be used by the IMU 103 to calculate the orientation and rotational acceleration of the camera, which can then be output to the gimbal control system 150. In some embodiments, the sensor unit 101 is located on the mount platform 110. In some embodiments, the gimbal control system 150 receives data from sensors (e.g., an IMU 103) on the mount platform 110 and from the sensor unit 101 of the gimbal 100. In some embodiment the sensor unit 101 does not include the IMU 103 and instead receives position, acceleration, orientation, and/or angular velocity information from an IMU located on the camera 120.

The control logic unit 102 on the gimbal 100, the sensor unit 101, and the control logic unit 113 on the mount platform 110 constitute a gimbal control system 150. As discussed above, the IMU 103 of the sensor unit 101 produces an output indicative of the orientation, angular velocity, and acceleration of at least one point on the gimbal 100. The control logic unit 102 on the gimbal 100 receives the output of the sensor unit 101. In some embodiments, the control logic unit 113 on the mount platform 110 receives the output of the sensor unit 101 instead of, or in addition to the control logic unit 102 on the gimbal 100. The combination of the two control logic units 102 and 113 implement a control algorithm which control the motors of the gimbal 100 to adjust the orientation of the mounted object to a preferred position. Thus, the gimbal control system 150 has the effect of detecting and correcting deviations from the preferred orientation for the mounted object. Control algorithms suitable for this purpose are known to those skilled in the art.

The particular configuration of the two control portions of the gimbal control system 150 will vary between embodiments. In some embodiments, the control logic unit 102 on the gimbal 100 implements the entire control algorithm and the control logic unit 113 of the mount platform 110 provides parameters which dictate how the control algorithm is implemented. These parameters can be transmitted to the gimbal 100 when the gimbal 100 is originally connected to the mount platform 110. These parameters can include a range of allowable angles for each motor of the gimbal 100, the orientation, with respect to gravity, that each motor should correspond to, a desired angle for at least one of the three spacial axes with which the mounted object should be oriented, and parameters to account for different mass distributions of different cameras. In another embodiment, the control logic unit 113 on the mount platform 110 performs most of the calculations for the control algorithm and the control logic unit 102 on the gimbal 100 includes proportional-integral-derivative controllers (PID controllers). The PID controllers' setpoints (i.e., the points of homeostasis which the PID controllers target) can be controlled by the control logic unit 113 of the mount platform 110. The setpoints can correspond to motor orientations or to the orientation of the mounted object. In some embodiments, either the control logic unit 102 of the gimbal 100 or the control logic unit 113 or the mount platform 110 is omitted the control algorithm is implemented entirely by the other control logic unit.

The mount platform 110 is shown connected to the gimbal 100. The mount platform 110 may be, for example, an aerial vehicle, a handheld grip, a land vehicle, a rotating mount, a pole mount, or a generic mount, each of which can itself be attached to a variety of other platforms. The gimbal 100 may be capable of removably coupling to a variety of different mount platforms. The mount platform 110 can include a camera controller 111, an image/video receiver 112, and the aforementioned control logic unit 113. The image/video receiver 112 can receive content (e.g., images captured by the camera 120 or video currently being captured by the camera 120). The image/video receiver 112 can store the received content on a non-volatile memory in the mount platform 110. The image/video receiver 112 can also transmit the content to another device. In some embodiments, the mount platform 110 transmits the video currently being captured to a remote controller, with which a user controls the movement of the mount platform 110, via a wireless communication network.

The gimbal 100 can be coupled the camera 120 and to the mount platform 110 in such a way that the mount platform 110 (e.g., a remote controlled aerial vehicle or a hand grip) can generate commands via a camera controller 111 and send the commands to the camera 120. Commands can include a command to toggle the power the camera 120, a command to begin recording video, a command to stop recording video, a command to take a picture, a command to take a burst of pictures, a command to set the frame rate at which a video is recording, or a command to set the picture or video resolution. Another command that can be sent from the mount platform 110 through the gimbal 100 to the camera 120 can be a command to include a metadata tag in a recorded video or in a set of pictures. In this example configuration, the metadata tag contains information such as a geographical location or a time. For example, a mount platform 110 can send a command through the gimbal 100 to record a metadata tag while the camera 120 is recording a video. When the recorded video is later played, certain media players may be configured to display an icon or some other indicator in association with the time at which the command to record the metadata tag was sent. For example, a media player might display a visual queue, such as an icon, along a video timeline, wherein the position of the visual queue along the timeline is indicative of the time. The metadata tag can also instruct the camera 120 to record a location, which can be obtained via a GPS receiver (Global Positioning Satellite receiver) located on the mount platform 110 or the camera 120, in a recorded video. Upon playback of the video, the metadata can be used to map a geographical location to the time in a video at which the metadata tag was added to the recording.

Signals, such as a command originating from the camera controller 111 or video content captured by a camera 120 can be transmitted through electronic connections which run through the gimbal 100. In some embodiments, telemetric data from a telemetric subsystem of the mount platform 110 can be sent to the camera 120 to associate with video captured and stored on the camera 120. A camera control connection 140 can connect the camera controller 111 module to the camera 120 and a camera output connection 141 can allow the camera 120 to transmit video content or pictures to the image/video receiver 112. The connections can also provide power to the camera 120, from a battery located on the mount platform 110. The battery of the mount platform 110 can also power the gimbal 100. In an alternate embodiment, the gimbal 100 contains a battery, which can provide power to the camera 120. The connections between the camera 120 and the gimbal 100 can run through the gimbal 100 and the camera frame 130. The connection between the camera 120 and the mount platform 110 can constitute a daisy chain or multidrop topology in which the gimbal 100 and camera frame 130 act as buses. The connections can implement various protocols such as HDMI (High-Definition Multimedia Interface), USB (Universal Serial Bus), or Ethernet protocols to transmit data. In one embodiment, the camera output connection 141 transmits video data from the camera 120 via the HDMI protocol connection and the camera control connection 140 is a USB connection. In some embodiments, the connection between the camera 120 and the mount platform 110 is internal to the gimbal 100.

Example Aerial Vehicle Configuration

Figure 2:
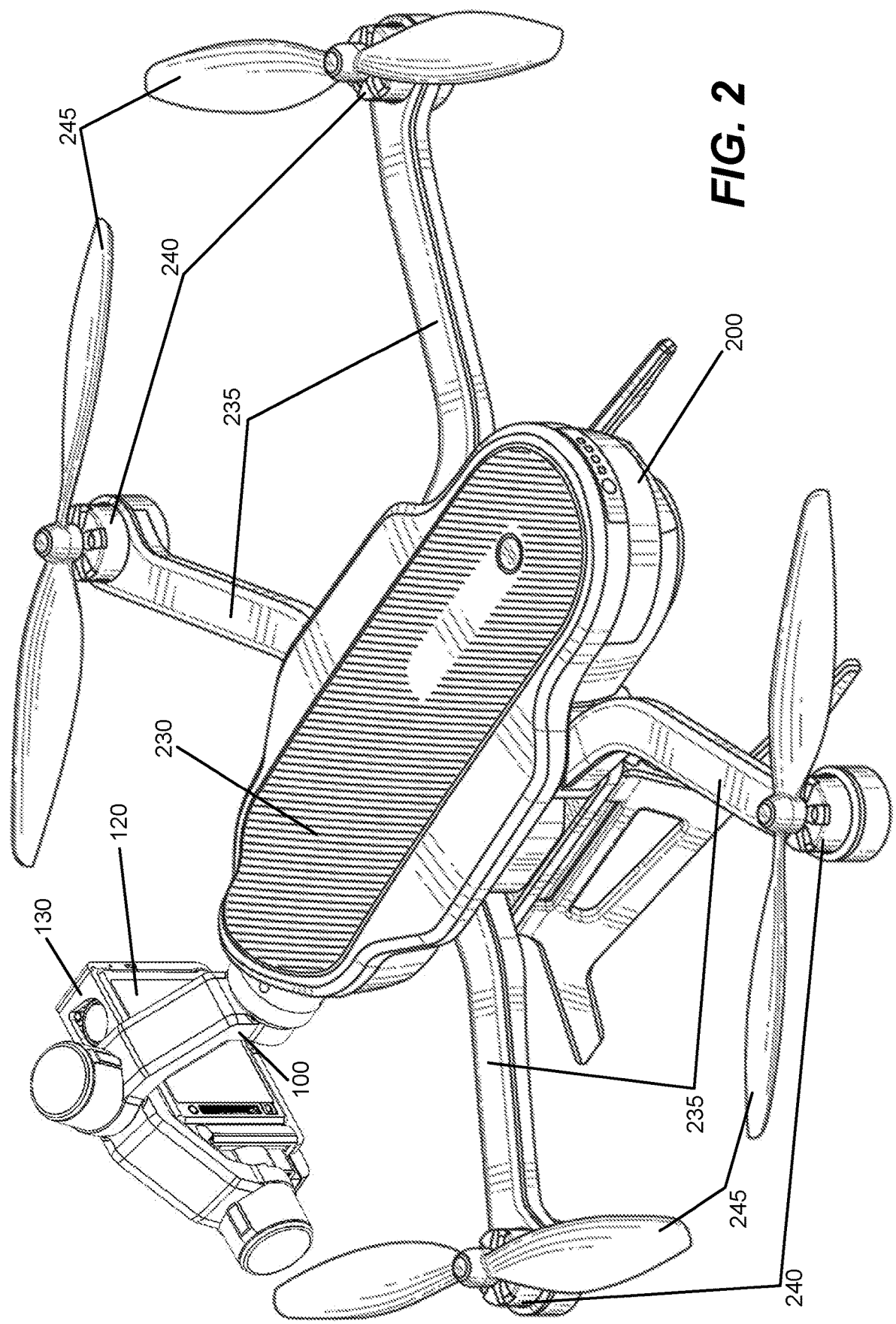
FIG. 2 illustrates an example of a gimbal coupled to a remote controlled aerial vehicle.

FIG. 2 illustrates an embodiment in which the mount platform 110 is an aerial vehicle 200. More specifically, the mount platform 110 in this example is a quadcopter (i.e., a helicopter with four rotors). The aerial vehicle 200 in this example includes housing 230 which encloses a payload (e.g., electronics, storage media, and/or camera), four arms 235, four rotors 240, and four propellers 245. Each arm 235 mechanically couples with a rotor 240, which in turn couples with a propeller 245 to create a rotary assembly. When the rotary assembly is operational, all the propellers 245 at appropriate speeds to allow the aerial vehicle 200 lift (take off), land, hover, and move (forward, backward) in flight. Modulation of the power supplied to each of the rotors 240 can control the trajectory and torque on the aerial vehicle 200.

A gimbal 100 is shown coupled to the aerial vehicle 200. A camera 120 is shown enclosed in a camera frame 130 which is attached the gimbal 100. The gimbal 100 is coupled to the housing 230 of the aerial vehicle 200 through a removable coupling mechanism that mates with a reciprocal mechanism on the aerial vehicle 200 having mechanical and communicative capabilities. The gimbal 100 can be removed from the aerial vehicle 200. The gimbal 100 can also be removably attached to a variety of other mount platforms, such as a handheld grip, a ground vehicle, and a generic mount, which can itself be attached to a variety of platforms. In some embodiments, the gimbal 100 can be attached or removed from a mount platform 110 without the use of tools.

Example Gimbal

Figure 3B:
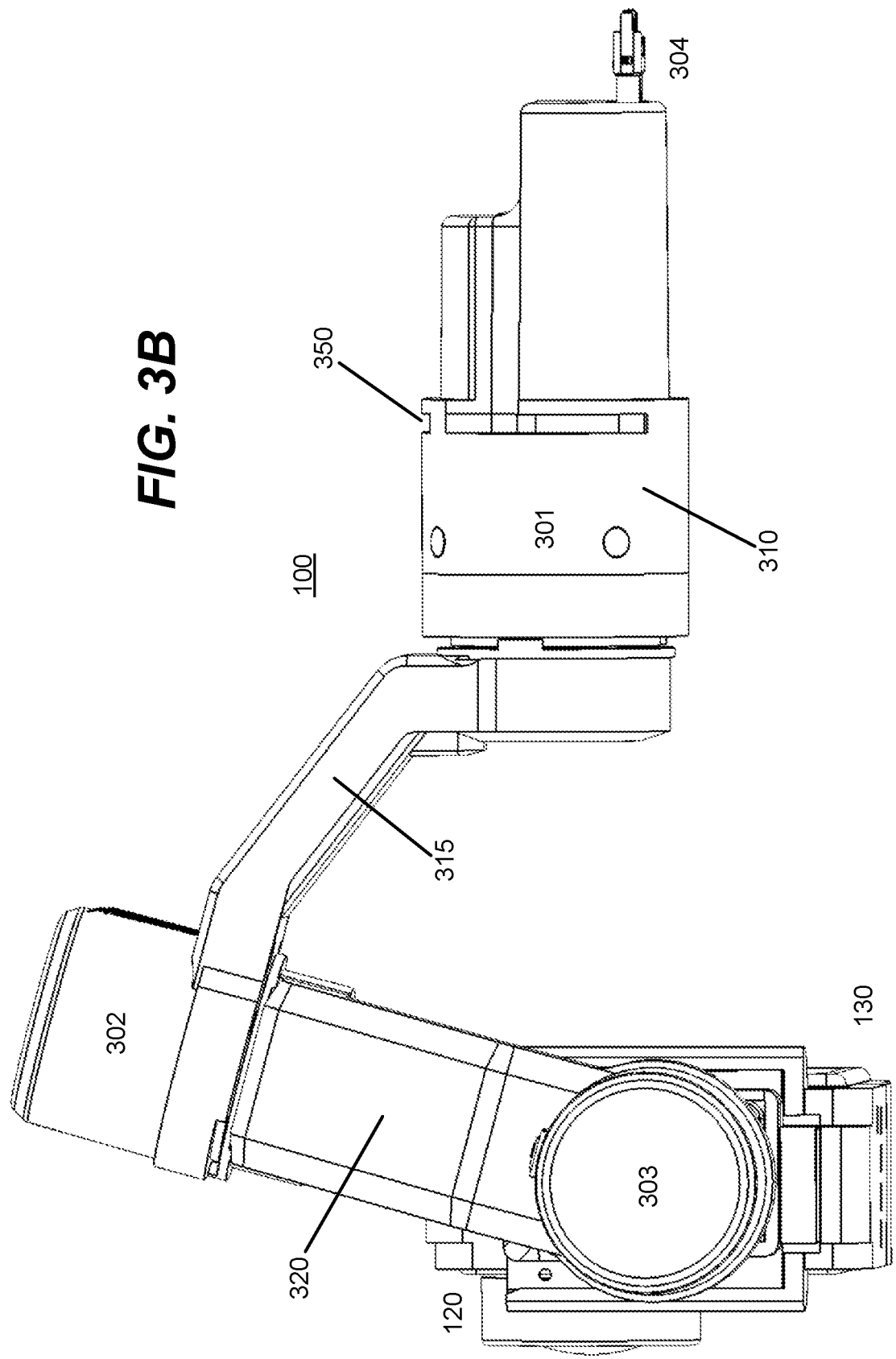

FIGS. 3A and 3B, illustrate an example embodiment of the gimbal 100 attached to a removable camera frame 130, which itself is attached to a camera 120. The example gimbal 100 includes a base arm 310, a middle arm 315, a mount arm 320, a first motor 301, a second motor 302, and a third motor 303. Each of the motors 301, 302, 303 can have an associated rotary encoder, which will detect the rotation of the axle of the motor. Each rotary encoder can be part of the sensor unit 101. The base arm 310 is configured to include a mechanical attachment portion 350 at a first end that allows the gimbal 100 to securely attach a reciprocal component on another mount platform (e.g., an aerial vehicle 200, a ground vehicle, or a handheld grip), and also be removable. The base arm 310 also includes the first motor 301. The base arm 310 couples to the middle arm 315. A first end of the middle arm 315 couples to the base arm 310, and a second end by the first motor 301. A second end of the middle arm 315 is where the second motor 302 is coupled. A first end of the mount arm 320 is coupled with the second end of the middle arm 315 at the second motor 302. The second end of the mount arm 320 is where the third motor 303 is coupled as well as the camera frame 130. Within the camera frame 130, the camera 120 is removably secured.

The gimbal 100 is configured to allow for rotation of a mounted object in space. In the embodiment depicted in FIG. 3A and FIG. 3B, the mounted object is a camera 120 to which the gimbal 100 is mechanically coupled. The gimbal 100 allows for the camera 120 to maintain a particular orientation in space so that it remains relatively steady as the platform to which it is attached moves (e.g., as an aerial vehicle 200 tilts or turns during flight). As is typically the case for electronic gimbals, the gimbal 100 has three motors, each of which rotates the mounted object (e.g., the camera 120) about a specific axis of rotation. Herein, for ease of discussion, the motors are numbered by their proximity to the mount platform 110 (i.e., the first motor 301, the second motor 302, and the third motor 303).

The gimbal control system 150 controls the three motors 301, 302, and 303. After detecting the current orientation of the mounted object, via the sensor unit 101, the gimbal control system 150 determines a preferred orientation along each of the three axes of rotation (i.e., yaw, pitch, and roll). The preferred orientation will be used by the gimbal control system 150 compute a rotation for each motor in order to move the camera 120 to the preferred orientation or keep the camera 120 in the preferred orientation. In one embodiment, the gimbal control system 150 has a preferred orientation that is configured by the user. The user can input the preferred orientation of the camera 120 with a remote controller which sends the preferred orientation for the camera 120 to the aerial vehicle 200 through a wireless network, which then provides the preferred orientation to the gimbal control system 150. In some embodiments the preferred orientation can be defined relative to the ground, so that the yaw, pitch, and roll of the camera remain constant relative to the ground. In some embodiments, certain axes of rotation can be unfixed. That is, an unfixed axis of rotation is not corrected by the gimbal control system 150, but rather remains constant relative to the aerial vehicle 200. For example, the yaw of the camera 120 can be unfixed, while the roll and the pitch are fixed. In this case, if the yaw of the aerial vehicle 200 changes the yaw of the camera 120 will likewise change, but the roll and the pitch of the camera 120 will remain constant despite roll and pitch rotations of the aerial vehicle 200. In some embodiments, bounds of rotation can be defined which limit the rotation along certain axes relative to the connection between the gimbal 100 and the mount platform 110. For example, if $\alpha_{max}$ and $\alpha_{min}$ are the relative maximum and minimum values for the yaw of the camera 120 relative to the mount platform 110, then if the aerial vehicle 200 is oriented at a yaw of $\alpha_{av}$ degrees, the preferred yaw of the camera $\alpha_c$ must be chosen by the gimbal control system 150 so that the angle $\alpha_c$ is between the angles $(\alpha_{min}+\alpha_{av})$ and $(\alpha_{max}+\alpha_{av})$. Similar maximum and minimum values can be defined for the pitch and roll. The maximum and minimum for each of the relative angles can be defined such that the viewing angle of the camera 120 is not obstructed by the gimbal 100 and/or the mount platform 110 at any angle within the valid bounds. In some embodiments, the preferred orientation of the camera 120 is defined using one or more tracking algorithms, which will be further discussed herein.

The axis to which each motor corresponds can depend on the mount platform 110 to which the gimbal 100 is attached. For example, when attached to the aerial vehicle 200, the first motor 301 can rotate the mounted object about the roll axis, the second motor 302 rotates corresponding to rotation in yaw and the third motor 303 corresponds to rotation in pitch. However, when the same gimbal 100 is attached to a handheld grip, the motors correspond to different axes: the first motor 301 corresponds to yaw, and the second motor 302 corresponds to roll, while the third motor 303 still corresponds to pitch.

In a conventional gimbal, each of the three motors 301, 302, 303 is associated with an orthogonal axis of rotation. However, in some embodiments, such as the embodiment depicted in FIG. 3A and FIG. 3B the motors 301, 302, 303 of the gimbal 100 are not orthogonal. A gimbal 100 in which the motors are not orthogonal will have at least one motor that rotates the mounted object about an axis which is not orthogonal to the axis of rotation of the other motors. In a gimbal 100 in which the motors are not orthogonal, operation of one motor of the gimbal 100 causes the angle of the camera 120 to shift on the axis of another motor. In the example embodiment shown in FIG. 3A and FIG. 3B, the first motor 301 and the third motor 303 have axes of rotation that are orthogonal to each other, and the second motor 302 and the third motor 303 are orthogonal, but the first motor 301 and second motor 302 are not orthogonal. Because of this configuration, when the gimbal 100 is coupled to the aerial vehicle 200 and the aerial vehicle 200 is level, operation of the first motor 301 adjusts only the roll of the camera 120 and the third motor 303 adjusts only the pitch of the camera 120. The second motor 302 adjusts the yaw primarily, but also adjusts the pitch and roll of the camera 120. Suppose for the purpose of example, the gimbal 100 is attached to the aerial vehicle 200 and the camera 120 is initially oriented at a pitch, yaw, and roll of 0° and that the axis of the second motor 302 is orthogonal to the axis of the third motor 303 and forms an angle of $\theta$ degrees with the vertical axis, as depicted in FIG. 3A and FIG. 3B. In FIG. 3B, the angle $\theta$ is measured clockwise, and is about 16°. A rotation of $\phi$ degrees (where $-180°\leq\phi\leq180°$) by the second motor 302 will also change the pitch, p, of the camera 120 to $p=(|\phi|*\theta)/90°$ where a pitch greater than 0 corresponds to the camera being oriented beneath the horizontal plane (i.e., facing down). The rotation of the second motor 302 by $\phi$ degrees will also change the roll, r, of the camera 120 to $r=\theta*(1-|\phi-90°|/90°)$ in the case where $-90°\leq\phi\leq180°$ and the roll will change to $r=-(\theta*\phi)/90°-\theta$ in the case where $-180°<\phi<-90°$. The change in the yaw, y, of the camera 120 will be equivalent to the change in angle of the second motor 302 (i.e., $y=\phi$).

A non-orthogonal motor configuration of the gimbal 100 can allow for a larger range of unobstructed viewing angles for the camera 120. For example, in the embodiment shown in FIG. 3A and FIG. 3B, the pitch of the camera 120 relative to the connection of the gimbal 100 to the mount platform 110 (e.g., aerial vehicle 200) can be about 16° higher without the camera's frame being obstructed (i.e., without the motor appearing in the image captured by the camera) than it could with an orthogonal motor configuration. In some embodiments, the second motor 302 is not identical to the other two motors 301, 303. The second motor 302 can be capable of producing a higher torque than the other two motors 301, 303.

A larger value of $\theta$ (the angle between the second motor 302 and the axis orthogonal to the rotational axes of the other two motors) in a non-orthogonal motor configuration can provide a larger range of viewing angles for the mounted camera 120, but a larger $\theta$ will require the higher maximum torque than a comparable orthogonal motor configuration. Thus, embodiments in which the motors are not orthogonal should implement a value of $\theta$ in which the two design considerations of a large viewing angle for the camera 120 and the torque required from the motors are optimized. Consequently, the choice of $\theta$ will depend on many factors, such as the targeted price point of the gimbal 100, the type of cameras supported, the desired use cases of the gimbal, the available motor technology, among other things. It is noted that by way of example, $\theta$ can between $0°\leq\theta\leq30°$.

The gimbal 100 can support a plurality of different cameras with different mass distributions. Each camera can have a corresponding detachable camera frame (e.g., camera 120 corresponds to the camera frame 130), which secures the camera. A camera frame 130 may have a connector, or a multiplicity of connectors, which couple to the gimbal 100 and a connector, or a multiplicity of connectors, which couple to the camera 120. Thus, the camera frame 130 includes a bus for sending signals from the camera to the gimbal 100, which can, in some cases, be routed to the mount platform 110. In some embodiments, each detachable camera frame has the same types of connectors for coupling to the gimbal 100, but the type of connector that connects to the camera is specific to the type of camera. In another embodiment, the camera frame 130 provides no electronic connection between the camera 120 and the gimbal 100, and the camera 120 and the gimbal 100 are directly connected. In some embodiments, the gimbal 100 does not contain a bus and the camera 120 and the mount platform 110 communicate via a wireless connection (e.g., Bluetooth or Wi-Fi).

In some embodiments, the gimbal 100 has a mount connector 304 (shown in FIG. 3B, but not in FIG. 3A) which allows the gimbal 100 to electronically couple to the mount platform 110 (e.g., the aerial vehicle 200). The mount connector 304 can include a power connection which provides power to the gimbal 100 and the camera 120. The mount connector 304 can also allow communication between the sensor unit 101 and control logic unit 102 on the gimbal 100 and the control logic unit 113 on the mount platform 110. In some embodiments, the mount connector 304 connects to the camera 120 via busses (e.g., a camera control connection 140 and a camera output connection 141) which allow communication between the mount platform 110 and the camera 120.

The gimbal 100 also can couple mechanically to a mount platform 110 via a mechanical attachment portion 350. The mechanical attachment portion 350 can be part of the base arm 310. The mechanical attachment portion 350 can include a mechanical locking mechanism to securely attach a reciprocal component on a mount platform 110 (e.g., an aerial vehicle 200, a ground vehicle, an underwater vehicle, or a handheld grip). The example mechanical locking mechanism shown in FIGS. 3A and 3B includes a groove with a channel in which a key (e.g., a tapered pin or block) on a reciprocal component on a mount platform 110 can fit. The gimbal 100 can be locked with the mount platform 110 in a first position and unlocked in a second position, allowing for detachment of the gimbal 100 from the mount platform 110. The mechanical attachment portion 350 connects to a reciprocal component on a mount platform 110 in which the mechanical attachment portion 350 is configured as a female portion of a sleeve coupling, where the mount platform 110 is configured as a male portion of a sleeve coupling. The coupling between the mount platform 110 and the gimbal 100 can be held together by a frictional force. The coupling between the mount platform 110 and the gimbal 100 can also be held together by a clamping mechanism on the mount platform 110.

If the gimbal 100 supports multiple different cameras of differing mass distributions, the differences in mass and moments of inertia between cameras might cause the gimbal 100 to perform sub-optimally. A variety of techniques are suggested herein for allowing a single gimbal 100 to be used with cameras of different mass distributions. The camera frame 130 can hold the camera 120 in such a way that the camera frame 130 and camera 120 act as a single rigid body. In some embodiments, each camera which can be coupled to the gimbal 100 has a corresponding detachable frame, and each pair of camera and frame have masses and moments of inertia which are approximately the same. For example, if $m_{ca}$ and $m_{fa}$ are the masses of a first camera and its corresponding detachable frame, respectively, and if $m_{cb}$ and $m_{fb}$ are the masses of a second camera and its corresponding detachable frame, then, $m_{ca}+m_{fa} \approx m_{cb}+m_{fb}$. Also, $I_{ca}$ and $I_{fa}$ are the matrices representing the moments of inertia for the axes around about which the first camera rotates for the first camera and the corresponding detachable frame, respectively. In addition, $I_{cb}$ and $I_{fb}$ are the corresponding matrices for the second camera and the corresponding detachable frame, respectively. Thereafter, $I_{ca}+I_{fa} \approx I_{cb}+I_{fb}$, where "+" denotes the matrix addition operator.) Since the mounted object which is being rotated by the gimbal is the rigid body of the camera and detachable camera frame pair, the mass profile of the mounted object does not vary although the mass profile of the camera itself does. Thus, by employing detachable camera frames e.g., 130, with specific mass profiles a single gimbal 100 can couple to a multiplicity of cameras with different mass profiles.

In alternate embodiments, the mass profile of the camera 120 and camera frame 130 pair is different for each different type of camera, but control parameters used in the control algorithms, implemented by the gimbal control system 150, which control the motors, are changed to compensate for the different mass profiles of each pair camera and detachable camera frame. These control parameters can specify the acceleration of a motor, a maximum or minimum for the velocity of a motor, a torque exerted by a motor, a current draw of a motor, and a voltage of a motor. In one embodiment, the camera 120 and/or the camera frame 130 is communicatively coupled to either the gimbal 100 or the mount platform 110, and upon connection of a camera 120 to the gimbal 100 information is sent from the camera 120 to the gimbal control system 150 which initiates the update of control parameters used to control the motors of the gimbal 100. The information can be the control parameters used by the gimbal control system 150, information about the mass profile (e.g., mass or moment of inertia) of the camera 120 and/or camera frame 130, or an identifier for the camera 120 or the camera frame 130. If the information sent to the gimbal control system 150 is a mass profile, then the gimbal control system 150 can calculate control parameters from the mass profile. If the information is an identifier for the camera 120 or the camera frame 130, the gimbal control system 150 can access a non-volatile memory which stores sets of control parameters mapped to identifiers in order to obtain the correct set of control parameters for a given identifier.

In some embodiments, the gimbal 100 is capable of performing an auto-calibration sequence. This auto-calibration sequence may be performed in response to a new camera 120 being connected to the gimbal 100, in response to an unrecognized camera 120 being attached to the gimbal 100, in response to a new mount platform 110 being connected to the gimbal, or in response to an input from a user. Auto-calibration may involve moving the gimbal 100 to a number of set orientations. The speed at which the gimbal re-orients the camera 120 can be measured and compared to an expected speed. The torque exerted by the motor, the current draw of the motor, the voltage used to motor can be adjusted so that the movement of the gimbal 100 is desirable.

In some embodiments, the movement characteristics of the gimbal 100 are adjusted according the type of mount platform 110 that the gimbal 100 is connected to. For example, each type of mount platform 110 can specify the maximum rotation speed of the gimbal 100, the maximum torque applied by the motors 301, 302, 303, or the weight given to the proportional, integral, and derivative feedback components used in a PID controller used to control a motor 301, 302, or 303. In some embodiments, the motor power used for motion dampening is determined based on the type of connected mount platform 110.

Handheld Grip

Figure 4:
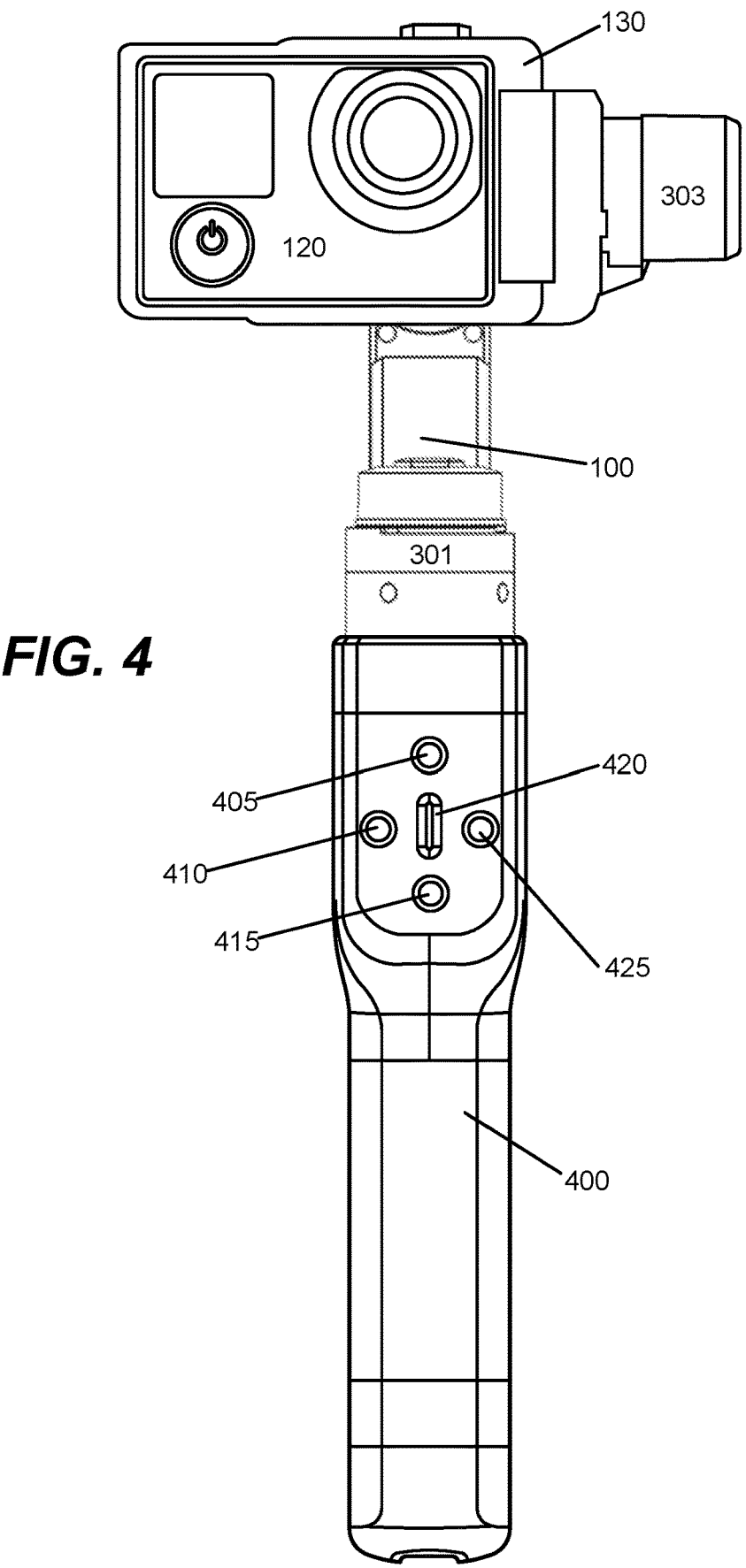
FIG. 4 illustrates a handheld grip coupled to a gimbal and camera.

FIG. 4 illustrates an example embodiment of a mount platform 110 that can removably couple with the gimbal 100. In this example, the mount platform 110 is a handheld grip 400 that electronically and mechanically couples with the gimbal 100. The handheld grip 400 includes a plurality of buttons 405, 410, 415, 420, 425 which can be used by a user to control the camera 120 and/or the gimbal 100. The handheld grip 400 contains a battery from which it can provide power to the gimbal 100 and may also be used to power and/or charge the camera 120 in addition to operating any electronic functions on the handheld grip 400 itself.

The handheld grip 400 can be communicatively coupled to the camera 120 via a connection provided by the gimbal 100. The camera 120 can provide captured video content and images to the handheld grip 400. In one embodiment, the handheld grip can store the provided video content and images in storage media, such as a flash storage, which can be removably coupled to the handheld grip 400 (e.g., a secure digital memory card (SD card) or a micro SD card) or integrated into the handheld grip 400 itself. In an alternate embodiment, the handheld grip 400 has a port which can be sued to connect to another device, such as a personal computer. This port can allow the connected device to request and receive video content and images from the camera 120. Thus, the connected device, would receive content from the camera 120 via a connection running through the camera frame 130, the gimbal 100, and the handheld grip 400. In some embodiments, the port on the handheld grip 400 provides a USB connection. The handheld grip can also transmit executable instructions to the camera 120. These instructions can take the form of commands which are sent to the camera 120 responsive to a user pressing a button on the handheld grip 400.

In some embodiments, the handheld grip includes a plurality of buttons 405, 410, 415, 420, 425. An instruction can be sent from the handheld grip 400 to the camera 120 responsive to pressing a button. In one embodiment, a first button 405 takes a picture or a burst of pictures. The first button 405 can also begin recording a video or terminate the recording of a video if it is currently recording. In some embodiments, the camera 120 can be in a picture mode, in which it takes pictures or bursts of pictures, or a video mode, in which it records video. The result of pressing the first button 405 can be determined by whether the camera 120 is in video mode or camera mode. A second button 410 can toggle the mode of the camera 120 between the video mode and picture mode. A third button 415 can toggle the power of the camera 120. A forth button 420 can change the mode of the camera 120 so that it takes bursts of pictures rather than a single picture responsive to pressing the first button 405. A fifth button 425 can change the frame rate at which the camera 120 records videos. In some embodiments, a button on the handheld grip can also change the resolution or compression rate at which pictures or videos are recorded. The handheld grip can include light emitting diodes (LEDs) or other visual indicators which can indicate the mode that the camera is operating in. For example, an LED of a first color can be turned on in order to indicate that the camera 120 is in picture mode and an LED of a second color can be turned on to indicate that the camera 120 is in video mode. In some embodiments, the handheld grip 400 can include an audio output device, such as an electroacoustic transducer, which plays a sound responsive to pressing a button. The sound played by the audio output device can vary depending on the mode of the camera. By way of example, the sound that is played when a video recording is initiated is different than the sound that is played when a picture is taken. As will be known to one skilled in the art, additional buttons with additional functions can be added to the handheld grip 400 and some or all of the aforementioned buttons can be omitted. In one embodiment, the handheld grip 400 has only two buttons: a first button 405 which operates as a shutter button, and a second button 410 which instructs the camera 120 to include a metadata tag in a recorded video, where the metadata tag can specify the time at which the second button 410 was pressed.

In some embodiments, the rotational angle of the camera 120 to which each motor corresponds can vary depending on the mount platform 110 to which the gimbal 100 is attached. In the embodiment shown in FIG. 4, the first motor 301 controls the yaw of the camera 120, the second motor 302 (not shown in FIG. 4) controls the roll of the camera 120, and the third motor 303 controls the pitch of the camera 120.

This configuration differs from that in FIG. 3A and FIG. 3B which depict the motors controlling the roll, yaw, and pitch, respectively. In some embodiments, the same gimbal 100 can operate in both configurations, responsive to the mount platform 110 to which it is connected. For example, when connected to the handheld grip 400 the gimbal's motors can operate as yaw, roll, and pitch motors, respectively, and when connected to the aerial vehicle 200 the gimbal's motors can operate as roll, yaw, and pitch motors.

In some embodiments, the camera's rotation for each axis of rotation can be fixed or unfixed. When the camera's rotation is fixed on an axis, then the camera will maintain that same orientation, relative to the ground, on that axis despite the movement of the handheld grip. Conversely, when the rotation of the camera 120 is unfixed on an axis, then the camera's rotation on that axis can change when the handheld grip 400 is rotated. For example, if the yaw of the camera 120 is unfixed then a change in the yaw of the handheld grip 400 by $\phi$ degrees can correspond to a change in the yaw of the camera 120 by $\phi$ or $-\phi$ degrees (depending on the point of reference for which the yaw is considered). If all three of the camera's axes are unfixed, then the motors 301, 302, 303 of the gimbal 100 will remain fixed (i.e., they will not turn) when the handheld grip 400 changes orientation. The gimbal control system 150 can have a fixed yaw mode and an unfixed yaw mode which dictates that the yaw of the camera 120 should remain fixed or unfixed, respectively. Similarly the gimbal control system 150 can have a fixed and unfixed mode for the roll and the pitch. The user can set the mode to unfixed for a certain axis and reorient the camera 120 to the desired angle along that axis, then set the mode for the axis to fixed so the camera 120 will remain at that angle. This will allow a user to easily set the preferred angle of the camera relative to the ground. The gimbal control system 150 can still stabilize the rotation along an axis, while in unfixed mode. In one embodiment, a second button 410 toggles the yaw mode between fixed and unfixed, the third button 415 toggles the pitch mode between fixed and unfixed, and the forth button 420 toggles the roll mode between fixed and unfixed. The axes of the gimbal 100 can be in a fixed mode or unfixed mode while connected to the aerial vehicle 200, as well. In one embodiment, the yaw is unfixed and the pitch and roll are fixed by default. In this embodiment, the yaw will be roughly fixed in the same direction relative to the mount device and the pitch and roll will remain fixed relative to a horizontal plane (e.g., the ground).

Example Aerial Vehicle System

Figure 5:
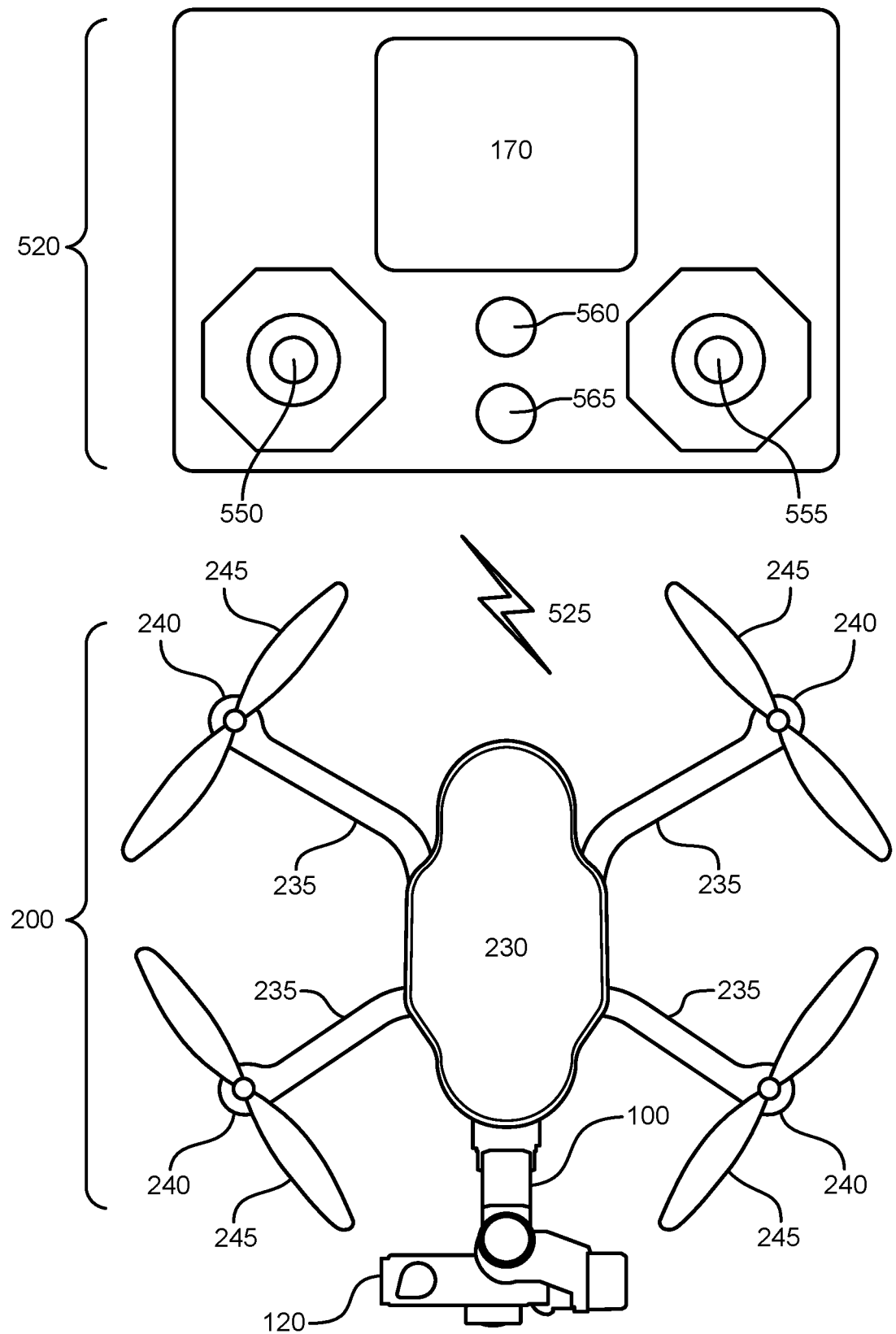
FIG. 5 illustrates an example configuration of remote controlled aerial vehicle in communication with a remote controller.

FIG. 5 illustrates a gimbal 100 attached to a remote controlled aerial vehicle 200, which communicates with a remote controller 520 via a wireless network 525. The remote controlled aerial vehicle 200 in this example is shown with a housing 230 and arms 235 of an arm assembly. In addition, this example embodiment shows a rotor 240 coupled with the end of each arm 235 of the arm assembly. Each rotor 240 is coupled to a propeller 510. The rotors 240 spin the propellers 510 when the motors are operational. The gimbal 100 connects a camera 120 to the remote controlled aerial vehicle 200.

The aerial vehicle 200 communicates with the remote controller 520 through the wireless network 525. The remote controller 520 may be a dedicated remote controller or can be another computing device such as a laptop, smartphone, or tablet that is configured to wirelessly communicate with and control the aerial vehicle 200. In one embodiment, the wireless network 525 can be a long range Wi-Fi system. It also can include or be another wireless communication system, for example, one based on long term evolution (LTE), 3G, 4G, or 5G mobile communication standards. In place of a single wireless network 525, the unidirectional RC channel can be used for communication of controls from the remote controller 520 to the aerial vehicle 200 and a separate unidirectional channel can be used for video downlink from the aerial vehicle 200 to the remote controller 520 (or to a video receiver where direct video connection may be desired).

The remote controller 520 in this example includes a first control panel 550 and a second control panel 555, an ignition button 560, a return button 565, and a screen 570. A first control panel, e.g., 550, can be used to control "up-down" direction (e.g. lift and landing) of the aerial vehicle 200. A second control panel, e.g., 555, can be used to control "forward-reverse" direction of the aerial vehicle 200. Each control panel 550, 555 can be structurally configured as a joystick controller and/or touch pad controller. The ignition button 560 can be used to start the rotary assembly (e.g., start the propellers 510). The return button 565 can be used to override the controls of the remote controller 520 and transmit instructions to the aerial vehicle 200 to return to a predefined location as further described herein. The ignition button 560 and the return button 565 can be mechanical and/or solid state press sensitive buttons. In addition, each button may be illuminated with one or more light emitting diodes (LED) to provide additional details. For example the LED can switch from one visual state to another to indicate with respect to the ignition button 560 whether the aerial vehicle 200 is ready to fly (e.g., lit green) or not (e.g., lit red) or whether the aerial vehicle 200 is now in an override mode on return path (e.g., lit yellow) or not (e.g., lit red). It also is noted that the remote controller 520 can include other dedicated hardware buttons and switches and those buttons and switches may be solid state buttons and switches. The remote controller 520 can also include hardware buttons or other controls that control the gimbal 100. The remote control can allow it's user to change the preferred orientation of the camera 120. In some embodiments, the preferred orientation of the camera 120 can be set relative to the angle of the aerial vehicle 200. In another embodiment, the preferred orientation of the camera 120 can be set relative to the ground.

The remote controller 520 also includes a screen (or display) 570 which provides for visual display. The screen 570 can be a touch sensitive screen. The screen 570 also can be, for example, a liquid crystal display (LCD), an LED display, an organic LED (OLED) display or a plasma screen. The screen 570 allow for display of information related to the remote controller 520, such as menus for configuring the remote controller 520 or remotely configuring the aerial vehicle 200. The screen 570 also can display images or video captured from the camera 120 coupled with the aerial vehicle 200, wherein the images and video are transmitted via the wireless network 525. The video content displayed by on the screen 570 can be a live feed of the video or a portion of the video captured by the camera 120. I.e., the video content displayed on the screen 570 is presented within a short time (preferably fractions of a second) of being captured by the camera 120. In some embodiments, the layout of the visual display is adjusted based on the camera 120 connected to the gimbal 100. For example, if the camera 120 is not capable of providing a live feed of captured video, the visual display layout may be adjusted to omit a panel for display of the live camera feed, whereas otherwise the life feed would be displayed.

The video may be overlaid and/or augmented with other data from the aerial vehicle 200 such as the telemetric data from a telemetric subsystem of the aerial vehicle 200. The telemetric subsystem includes navigational components, such as a gyroscope, an accelerometer, a compass, a global positioning system (GPS) and/or a barometric sensor. In one example embodiment, the aerial vehicle 200 can incorporate the telemetric data with video that is transmitted back to the remote controller 520 in real time. The received telemetric data is extracted from the video data stream and incorporate into predefine templates for display with the video on the screen 570 of the remote controller 520. The telemetric data also may be transmitted separate from the video from the aerial vehicle 200 to the remote controller 520. Synchronization methods such as time and/or location information can be used to synchronize the telemetric data with the video at the remote controller 520. This example configuration allows a user, e.g., operator, of the remote controller 520 to see where the aerial vehicle 200 is flying along with corresponding telemetric data associated with the aerial vehicle 200 at that point in the flight. Further, if the user is not interested in telemetric data being displayed real-time, the data can still be received and later applied for playback with the templates applied to the video.

The predefine templates can correspond with "gauges" that provide a visual representation of speed, altitude, and charts, e.g., as a speedometer, altitude chart, and a terrain map. The populated templates, which may appear as gauges on the screen 570 of the remote controller 520, can further be shared, e.g., via social media, and or saved for later retrieval and use. For example, a user may share a gauge with another user by selecting a gauge (or a set of gauges) for export. Export can be initiated by clicking the appropriate export button, or a drag and drop of the gauge(s). A file with a predefined extension will be created at the desired location. The gauge to be selected and be structured with a runtime version of the gauge or can play the gauge back through software that can read the file extension.

Pole Mount Apparatus

Figure 6:
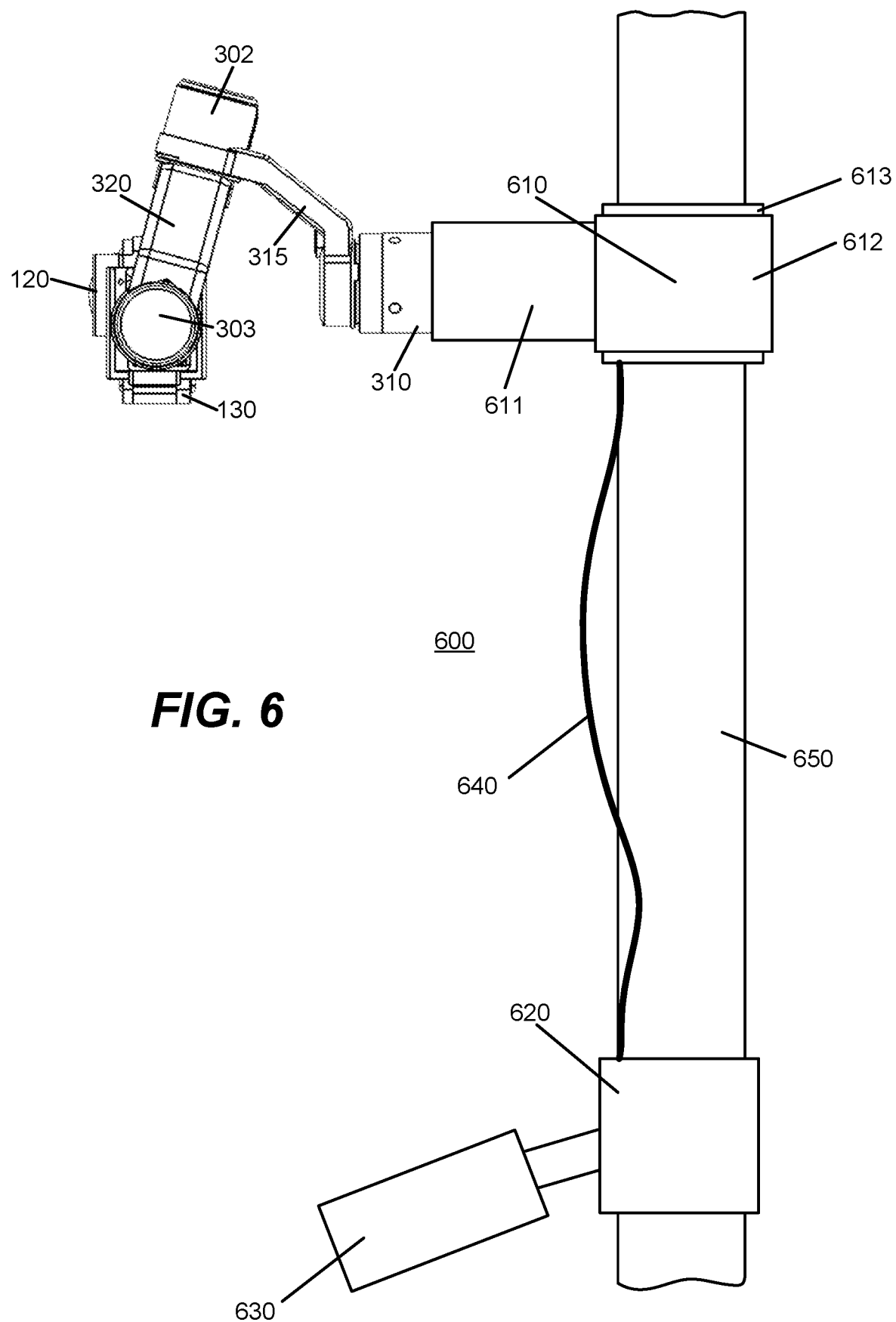
FIG. 6 illustrates an example of a gimbal coupled to a pole mount apparatus.

FIG. 6 illustrates an example embodiment of a gimbal 100 coupled to a pole mount apparatus 600. The pole mount apparatus 600 consists of an upper clamp 610, a lower clamp 620, a controller 630, and a cable 640. The two clamps 610, 620 are removably coupled to a pole 650. The cable 640 connects the upper and lower clamps 610, 620. The upper clamp 610 comprises a connection housing 611, an outer shell 612, and an inner shell 613. The gimbal 100 can be removably coupled to the upper clamp 610. The mount connector 304 of the gimbal 100 couples to a reciprocal coupling end in the connection housing 611. The lower clamp 620 can be coupled to the controller 630.

In some embodiments, the upper clamp 610 is equipped with at least one electric motor, which rotates the connection housing 611 and the outer shell 612 about the axis of the pole 650. The inner shell 613 remains rigidly coupled to the pole while the outer shell 612 rotates. In this configuration, the gimbal 100 can continuously rotate about the pole 650 without twisting the cable 640 connecting the upper clamp 610 to the lower clamp 620, which is coupled to the inner shell 613. In alternate embodiments, the upper clamp 610 consists of a single shell and when locked to the pole 650 cannot rotate.

In some embodiments, the clamps 610, 620 are not removable from the pole 650. As such embodiments, the two clamps 610, 620 can be locked onto the pole 650, which prevents them from being moved. The clamps 610, 620 can be unlocked which allows them to slide up and down the pole 650, but not detached from the pole 650. In some embodiments, the clamps 610, 620 can also be rotated around the pole 650 when unlocked. In some embodiments, the lower clamp 620 is rigidly coupled to the pole 650 and cannot be unlocked, shifted vertically, or rotated without the use of tools. In alternate embodiments, the lower clamp 620 is omitted entirely and the controller 630 is connected directly to the pole 650. In some embodiments, the upper clamp 610 is omitted and the mount connector 304 of the gimbal 100 couples directly to a corresponding connector on the pole 650. In some embodiments, the height of the pole 650 is adjustable.

In some embodiments, at least one of the clamps 610, 620 has a first locking mechanism which enables the clamp to move up and down the pole 650 or to detach from the pole 650 entirely and a second locking mechanism which enables the clamp to be rotated about the pole 650. The upper clamp 610 can have a locking mechanism which when locked or unlocked, serves to fix the rotation of the outer shell 612 or allow for rotation of the outer shell 612, respectively. In some embodiments, the lower clamp 620 is always free to rotate. In some embodiments, the clamps 610, 620 are capable of coupling to poles having a range of thicknesses.

The controller 630 allows for user input to the control the operation of the camera 120, the gimbal 100, or the rotation of the outer shell 612. The controller 630 may include a display that provides for display of video or images captured by the camera 120. The controller 630 can receive an input from a user through buttons, switches, or a touch screen and transmit an instruction to the camera 120 to perform an action. This can be an instruction to take a picture or a burst of pictures, begin recording a video, terminate the recording of a video, toggle the mode of the camera 120 between a video mode and a picture mode, toggle the power of the camera 120, change the mode of the camera 120 so that it takes bursts of pictures rather than a single picture, change the frame rate at which the camera 120 records videos, change the resolution or compression rate at which pictures or videos are recorded. The controller 630 can also receive input from a user to trigger the gimbal 100 or upper clamp 610 to perform an action. For example, after receiving an input from a user, the controller 630 can transmit a command to the gimbal 100 to change the orientation of the camera 120, or transmit a command to the upper clamp 610 to rotate. In some embodiments the controller 630 receives power from an internal battery or an external power source and provides power through the cable 640 to the gimbal 100, the motor of the upper clamp 610, or the camera 120. In some embodiments, the controller 630 contains a control logic unit 113 which is part of the gimbal control system 150 which controls the movement of the gimbal 100.

Unlike the handheld grip 400 or aerial vehicle 200, the pole mount apparatus 600 is not expected to move. Consequently, the gimbal control system 150 can leave the roll of the camera 120 fixed, rather than continuously parsing data from the sensor unit 101 of the gimbal 100 in order to detect changes. If the gimbal 100 is not actively tracking an object, then it may be advantageous to fix all of the motors 301, 302, 303 of the gimbal 100. Alternately, the gimbal control system 150 can operate using reduced complexity or with a lower frequency of receiving input from the sensing unit 101. These simplifications can result in reduced computational complexity and power consumption for the gimbal control system 150.

In some embodiments, the cable 640 provides a wired connection which allows for communication between the controller 630 and the gimbal 100 or the camera 120. The cable 640 can transmit commands input by a user into the controller 630 to the gimbal 100, the camera 120, or the upper clamp 610. The controller 630 may also receive captured images or video from the camera 120 through the cable 640. A control logic unit 102 and sensor unit 101 on the gimbal 100 can communicate through the cable 640 with control logic unit 13 on the controller 630 in order to provide for control of the gimbal 100. In some embodiments, the cable is internal to the pole 650. In yet other embodiments, the cable 640 could be replaced with a wireless communication connection, e.g., Bluetooth.

In some embodiments, the cable 640 retracts into the upper clamp 610 or lower clamp 620. For example, a button on the lower clamp 620 can cause the cable 640 to be automatically retracted into the lower clamp. In this manner a user can easily mitigate excess cable slack.

In some embodiments, the cable 640 is omitted and the controller communicates wirelessly with the gimbal 100 or the camera 120. In some embodiments, the controller 630 is not attached to the rest of the pole mount apparatus 600, and function as a wireless remote controller. In some embodiments, the controller 630 includes a network interface which allows for communication with a network such as a Wi-Fi network. The controller 630 may receive commands or transmit images and video over the network to a second device.

Attitude Sensing System

Figure 7:
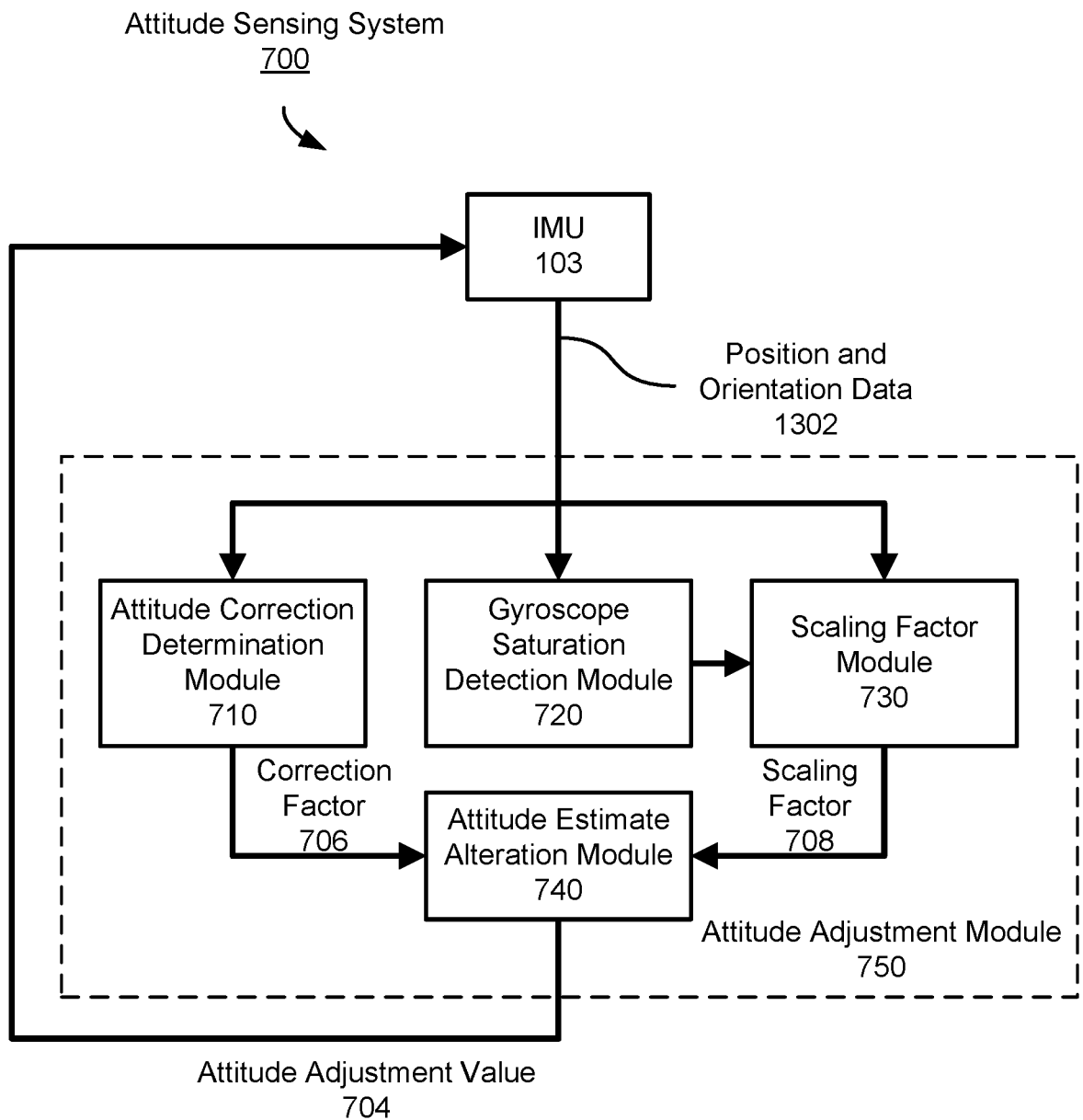
FIG. 7 is a block diagram of an attitude sensing system in accordance with an example embodiment.

FIG. 7 illustrates a block diagram of an attitude sensing system 700 in accordance with an example embodiment. The attitude sensing system 700 includes the IMU 103 described earlier and an attitude adjustment module 750. The attitude adjustment module 750 interfaces with the IMU 103 to correct an attitude estimate of the IMU 103. The attitude adjustment module 750 receives position and orientation data 702 from the IMU 103 and outputs an attitude adjustment value 704 to the IMU 103. The attitude adjustment module 750 may be an element of the gimbal control system 150 and may be on the gimbal 100, the mount platform 110, or a combination of both. The attitude adjustment module 750 may include an attitude correction determination module 710, a gyroscope saturation detection module 720, a scaling factor module 730, and an attitude estimate adjustment module 740.

Components of the attitude adjustment module 750 may be implemented as a set of software instructions stored in a non-transitory computer-readable storage medium such as a non-volatile memory (e.g., on the gimbal 100 and/or the mount platform 110) and executed by one or more processors. Alternately, components of the attitude adjustment module 750 may be a hardware module including dedicated circuitry or logic that is permanently configured (e.g., as a special-purpose processor, such as a field programmable gate array (FPGA) or an application-specific integrated circuit (ASIC)) to perform the functions attributed to the attitude adjustment module 750 herein. Components of the attitude adjustment module 750 may also include programmable logic or circuitry (e.g., as encompassed within a general-purpose processor or other programmable processor) that is temporarily configured by software to perform certain operations.

The position and orientation data 702 generated by the IMU 103 includes an adjusted attitude estimate comprising an estimated orientation in three dimensional space and accelerometer data representing the proper acceleration vector in three-dimensional space (e.g., including a magnitude and direction). The IMU 103 determines a sensed attitude representing a sensed current orientation of the IMU 103. If the IMU 103 is positioned in the camera 120 or in the gimbal arm connecting to the camera 120, then the sensed attitude may represent the attitude of the camera 120. For example, the sensed attitude may include an inclination (the angle that the axis of the camera 120 makes with the horizontal plane), the declination (the horizontal angle of the axis of the camera 120 relative to some reference direction, such as due north), and/or a roll (the rotation of the camera 120 about the axis defined by the inclination and the declination). In an embodiment, the IMU 103 determines the sensed attitude based on a history of gyroscope readings indicating detected changes in the orientation (i.e., rotational velocity). By integrating the changes in the orientation over time, the IMU 103 may determine an estimate of the current attitude, provided that the IMU 103 previously estimated the correct initial orientation. However, over time, drift error may accumulate and the sensed attitude of the IMU may become increasingly inaccurate. The IMU 103 corrects the sensed attitude of the IMU 103 to remedy the issue of drift error by adding an attitude adjustment value to the sensed attitude and outputting an adjusted sensed attitude in the position and orientation data 1302.

The attitude correction determination module 710 determines a correction factor 706 based on the received position and orientation data 702 from the IMU 103 including the adjusted sensed attitude and an acceleration vector. The attitude correction determination module 710 may estimate the orientation of the IMU 103 from the direction of the acceleration vector provided by the IMU 103. Here, the acceleration vector from the IMU 103 correspond to proper acceleration representing the acceleration of the IMU 103 relative to a free-fall (or inertial) observer. In other words, the acceleration vector is the sum of the acceleration in a static reference frame and an acceleration vector that is equal and opposite to gravity (i.e., directed straight up with a magnitude of approximately 9.81 m/s$^2$). Accordingly, given the assumption that the IMU 103 is not undergoing any acceleration (or if the acceleration is small compared to 9.81 m/s$^2$), the direction of the acceleration vector measured by the accelerometer of the IMU 103 are approximately in the vertical direction opposite to gravity. The attitude correction determination module 710 may estimate the orientation (e.g., the inclination and the roll) of the IMU 103 by assuming that under stable conditions, the vector output by the accelerometer of the IMU 103 corresponds to the vertical direction (i.e., opposite gravity). For example, when the attitude correction determination module 710 observes a relatively stable acceleration of 9.81 m/s$^2$ over some threshold time period, it treats the IMU 103 as being stable and determines the orientation of the IMU 103 by mapping the direction of the acceleration vector to the upward direction opposite gravity.

The attitude correction determination module 710 generates a correction factor 706 that may be based on an instantaneous difference value (e.g., the difference between the current attitude estimate of the IMU 103 and the orientation estimated based on the current output of the accelerometers of the IMU 103). Alternately, the correction factor 706 may be based on a history of difference values over a period of time (e.g., a weighted sum of the N previous difference values, for some integer N). The correction factor 706 may be a vector representing multiple angles of the attitude estimate to correct. For example, the correction factor 706 may be a two dimensional vector representing a correction to the inclination and the roll of the attitude estimate of the IMU 103.

The gyroscope saturation detection module 720 detects whether the gyroscope of the IMU 103 that provides the sensed attitude has been saturated. Some gyroscopes have a bounded region of rotational velocities that they can detect accurately. If the rotational velocity falls outside this bounded region (e.g., is greater than or equal to a predefined maximum value), the gyroscope is referred to as being saturated. When the gyroscope is saturated, the IMU 103 may not be able to provide an accurate measurement of the rotational velocity. As a result, after the gyroscope has become saturated, the sensed attitude of the IMU 103 may have significant error, even after the gyroscope is no longer saturated. The IMU 103 may be configured to provide a signal to the gyroscope saturation detection module 720 when the gyroscope detects that it is saturated. Alternately, the IMU 103 may output an extreme value (e.g., the highest or lowest rotational velocity) when its gyroscope is saturated, and the gyroscope saturation detection module 720 may infer saturation based on that.

The scaling factor module 730 determines a scaling factor 708 based on the position and orientation data received from the IMU 103 and based on input from the gyroscope saturation detection module 720, in accordance with an example embodiment. The scaling factor 708 determines how quickly to adjust the sensed attitude of the IMU 103. For example, a high scaling factor may cause the sensed attitude of the IMU 103 to be adjusted quickly, while conversely a low scaling factor may cause the sensed attitude to be adjusted slowly (or not at all). The scaling factor 708 may be vector corresponding to a multi-dimensional rotation. The elements of a scaling factor vector may correspond to elements in the correction factor (e.g., a first element for the inclination and a second value for the roll).

The scaling factor module 730 may determine the scaling factor 708 based on two aspects. First, if the attitude estimate of the IMU 103 is likely to have a large error, the scaling factor may have a larger magnitude. The scaling factor module 730 may determine that error in the attitude estimate is likely to be large if the gyroscope saturation detection module 720 indicates that the gyroscope of the IMU 103 is saturated or was saturated recently (e.g., within a threshold time period of the current time).

Secondly, the magnitude of the scaling factor 708 may depend on the reliability of the correction factor 706. If, for example, the data from the accelerometer of the IMU 103 is consistent with the gimbal 100 being held steady (i.e., if the vector output by the accelerometer has a magnitude that is approximately equal to 9.81 m/s$^2$ and the direction of the output vector does not vary greatly over some period of time), this indicates that the orientation estimated by the attitude correction determination module 710 based on accelerometer data is likely accurate and that the correction factor 706 is likely reliable. For example, the scaling factor module 730 may determine a magnitude similarity measure representing a similarity between the magnitudes of a sensed acceleration vector and a gravity vector, and may generate a direction stability measure based on changes in direction of the sensed acceleration vector over a fixed time range. The scaling factor module 703 may determine a stability measure based on the magnitude similarity measure and the directional stability measure, and generate the scaling factor 708 based in part on the stability measure. Thus, the scaling factor module 730 may, in some embodiments, output a large scaling factor 708 if the accelerometer data indicates an acceleration of 9.81 m/s$^2$ in a direction that does not vary greatly in a time period (e.g., low motion). Conversely, the scaling factor 708 may be small if the direction indicated by the acceleration vector changes significantly, or if the magnitude of the acceleration vector indicated by the accelerometer data is significantly less than or greater than 9.81 m/s² (high motion). Thus, the scaling factor 708 may be larger when the gimbal 100 is held steady and lower when higher motion is present.

The attitude estimate adjustment module 740 outputs an attitude adjustment value 704 based on the correction factor 706 received from the attitude correction determination module 710 and the one or more scaling factors 708 received from the scaling factor module 730. The attitude estimate adjustment value 704 may be an arithmetic multiplication of the correction factor 706 and the scaling factors 708, although other embodiments are also possible. The attitude estimate adjustment value 704 may be received by the IMU 103 and used to correct its attitude estimate in the position and orientation data 702.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed embodiments. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aerial vehicle comprising:
   an inertial measurement unit to generate a sensed attitude and to generate a sensed acceleration vector, the inertial measurement unit to combine the sensed attitude with an attitude adjustment value to generate an adjusted sensed attitude;
   an attitude correction determination module to generate an estimated attitude from the sensed acceleration vector and to generate an attitude correction factor based on a difference between the estimated attitude and the adjusted sensed attitude;
   a scaling factor module to generate a scaling factor based on a stability measure of the inertial measurement unit; and
   an attitude estimate alteration module to combine the attitude correction factor and the scaling factor to generate an attitude estimate adjustment value.

2. The aerial vehicle of claim 1, further comprising:
   at least one gyroscope; and
   a gyroscope saturation detection module to detect a saturation condition of the at least one gyroscope and to generate a saturation condition signal indicative of the saturation condition, wherein the scaling factor module generates the scaling factor based on the saturation condition signal.

3. The aerial vehicle of claim 2, wherein the gyroscope saturation detection module outputs the saturation condition signal when the sensed attitude reaches a predefined maximum output value.

4. The aerial vehicle of claim 1, wherein the scaling factor module detects the stability measure by determining a magnitude similarity between the sensed acceleration vector and a gravity vector, determining a directional stability based on a change in direction of the sensed acceleration vector over a fixed time range, and determining the stability measure based on the magnitude similarity and the directional stability.

5. The aerial vehicle of claim 1, wherein the scaling factor increases when motion of the inertial measurement unit decreases and the scaling factor decreases when motion of the inertial measurement unit increases.

6. The aerial vehicle of claim 1, wherein the attitude correction determination module stores a history of estimated attitudes from a history of sensed acceleration vectors and stores a history of adjusted sensed attitudes, further wherein the attitude correction determination module generates the attitude correction factor based on an average difference between the history of estimated attitudes and the history of adjusted sensed attitudes.

7. The aerial vehicle of claim 1, further comprising:
   a gimbal.

8. The aerial vehicle of claim 7, further comprising:
   a camera mounted to the gimbal.

9. An attitude sensing system comprising:
   a first module to generate a sensed attitude and to generate a sensed acceleration vector, the first module to combine the sensed attitude with an attitude adjustment value to generate an adjusted sensed attitude;
   a second module to generate an estimated attitude from the sensed acceleration vector and to generate an attitude correction factor based on a difference between the estimated attitude and the adjusted sensed attitude;
   a third module to generate a scaling factor based on a stability measure of the first module; and
   a fourth module to combine the attitude correction factor and the scaling factor to generate an attitude estimate adjustment value.

10. The attitude sensing system of claim 9, further comprising:
    a fifth module to detect a saturation condition of at least one gyroscope and to generate a saturation condition signal indicative of the saturation condition, wherein the third module generates the scaling factor based on the saturation condition signal.

11. The attitude sensing system of claim 10, wherein the fifth module generates the saturation condition signal when the sensed attitude reaches a predefined maximum output value.

12. The attitude sensing system of claim 9, wherein the third module detects the stability measure by determining a magnitude similarity between the sensed acceleration vector and a gravity vector, determining a directional stability based on a change in direction of the sensed acceleration vector over a fixed time range, and determining the stability measure based on the magnitude similarity and the directional stability.

13. The attitude sensing system of claim 9, wherein the scaling factor increases when motion of the first module decreases and the scaling factor decreases when motion of the first module increases.

14. The attitude sensing system of claim 9, wherein the second module stores a history of estimated attitudes from a history of sensed acceleration vectors and stores a history of adjusted sensed attitudes, further wherein the second module generates the attitude correction factor based on an average difference between the history of estimated attitudes and the history of adjusted sensed attitudes.

15. The attitude sensing system of claim 9, wherein the attitude sensing system is integrated with an aerial vehicle that includes a gimbal and a camera.

16. A method comprising:
    detecting an attitude and an acceleration vector;
    generating an adjusted attitude based on the attitude and an attitude adjustment value;
    generating an estimated attitude from the acceleration vector;
    generating an attitude correction factor based on a difference between the estimated attitude and the adjusted attitude;
    determining a stability measure based on the acceleration vector;
    generating a scaling factor based on the stability measure; and
    combining the attitude correction factor and the scaling factor to generate an attitude estimate adjustment value.

17. The method of claim 16, further comprising:
    detecting a saturation condition of one or more gyroscopes; and
    generating a saturation condition signal indicative of the saturation condition, wherein the scaling factor is generated based on the saturation condition signal.

18. The method of claim 17, wherein detecting the saturation condition of one or more gyroscopes comprises:
    detecting that the attitude reaches a predefined maximum output value.

19. The method of claim 16, wherein determining the stability measure based on the acceleration vector comprises:
    determining a magnitude similarity between the acceleration vector and a gravity vector;
    determining a directional stability based on a change in direction of the acceleration vector over a fixed time range; and
    determining the stability measure based on the magnitude similarity and the directional stability.

20. The method of claim 16, further comprising:
    storing a history of estimated attitudes from a history of sensed acceleration vectors;
    storing a history of adjusted sensed attitudes; and
    wherein generating the attitude correction factor comprises determining an average difference between the history of estimated attitudes and the history of adjusted sensed attitudes.

* * * * *